United States Patent [19]

Swierbut et al.

[11] Patent Number: 5,599,644

[45] Date of Patent: Feb. 4, 1997

[54] CATHODES FOR ELECTROCHEMICAL CELLS HAVING ADDITIVES

[75] Inventors: Wendi M. Swierbut, Westlake; John C. Nardi, Brunswick, both of Ohio

[73] Assignee: Eveready Battery Company, Inc., St. Louis, Mo.

[21] Appl. No.: 485,424

[22] Filed: Jun. 7, 1995

[51] Int. Cl.⁶ .................................................. H01M 4/50
[52] U.S. Cl. .......................................... 429/224; 429/229
[58] Field of Search .................................. 429/224, 206, 429/229, 218; 423/599, 610, 633

[56] References Cited

U.S. PATENT DOCUMENTS

| | | | |
|---|---|---|---|
| 1,058,778 | 4/1913 | Morrison | 429/232 |
| 4,096,318 | 6/1978 | Wurmb et al. | 429/224 X |
| 5,026,617 | 6/1991 | Kosaka et al. | 429/206 |
| 5,156,934 | 10/1992 | Kainthia et al. | 429/224 |
| 5,342,712 | 8/1994 | Mieczkowska et al. | 429/224 |

*Primary Examiner*—Anthony Skapars
*Attorney, Agent, or Firm*—Robert W. Welsh

[57] ABSTRACT

A cathode for use in an electrochemical cell having an anode and an electrolyte. The cathode includes a manganese dioxide active material and an additive which includes at least one of $SnO_2$, $Fe_2O_3$-$TiO_2$, $TiO_2$ (P-25), $BaTiO_3$, $K_2TiO_3$, $Nb_2O_5$, or $SnO$. The cathode of the present invention is particularly adapted for use in an electrochemical cell having a zinc anode and an alkaline electrolyte.

9 Claims, 5 Drawing Sheets

CATHODES FOR ELECTROCHEMICAL CELLS HAVING ADDITIVES

BACKGROUND OF THE INVENTION

The present invention generally relates to electrochemical cells including cathode additives and more particularly to primary alkaline electrochemical cells having cathodes formed of manganese dioxide, one or more oxide additives, and other cathode components.

Typical alkaline cells include a steel cylindrical can having a cathode comprising manganese dioxide as the active material and formed on the interior surface of the steel can, an anode comprising zinc and located in the center of the cell, a separator located between the anode and the cathode, and an alkaline electrolyte simultaneously contacting the anode, cathode, and separator. A conductive anode current collector is inserted into the anode active material and a seal assembly closes the open end of the steel can.

A primary goal in designing alkaline batteries is to increase the service performance of the cell. TIle service performance is the length of time for the cell to discharge under a given load to a specific voltage at which the cell is no longer useful for its intended purpose. One approach taken to increase service performance was to increase the interior volume of the cell in order to increase the amount of active materials within the cell. However, the commercial external size of the cell is fixed, thereby limiting the ability to increase the amounts of active materials within the cell. In order to accommodate more active materials within the cell while maintaining the external size of the cell, tile steel label of the conventional alkaline cell has been replaced with one made of thinner metalized plastic film. Thus, the steel can may be enlarged to provide a greater internal volume. By switching to a thinner plastic film label, the service performance of a typical alkaline cell was significantly increased.

Another approach taken to increase the service performance of a cell is to utilize an anatase titanium dioxide as an additive to a cathode having manganese dioxide as the active material. Despite past increases in service performance, the need to find new ways to increase service performance remains the primary goal of cell designers.

SUMMARY OF THE INVENTION

The present invention improves the service performance of alkaline cells by the addition of one or more oxide additives to the active cathode material. To achieve this and other advantages, and in accordance with the purpose of the invention as embodied and broadly described herein, the cathode of the present invention comprises a manganese dioxide active material and an additive comprising one or more of $SnO2$, $Fe_2O_3$-$TiO_2$, $TiO_2$ (P-25), $BaTiO_3$, $K_2TiO_3$, $Nb_2O_5$, or $SnO$. The cathode of the present invention is particularly adapted for use in an electrochemical cell having a zinc anode and an alkaline electrolyte.

These and other features, objects, and benefits of the invention will be recognized by those who practice the invention and by those skilled in the art, from reading the tollowing specification and claims together with reference to the accompanying drawings.

DESCRIPTION OF THE PREFERRED EMBODIMENTS

Figure 1:
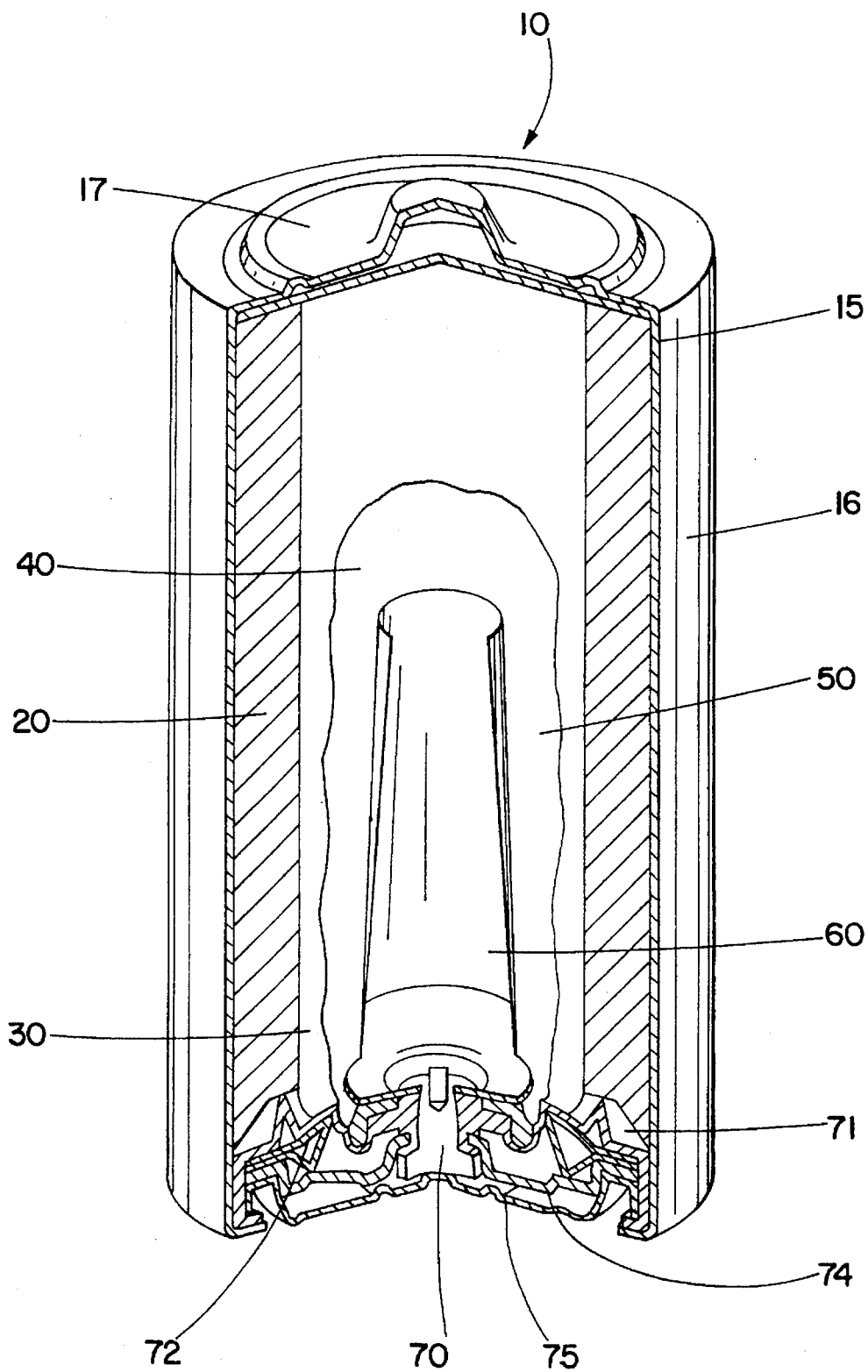
FIG. 1 is a cutaway perspective view of an example of an electrochemical cell constructed in accordance with the present invention.

FIG. 1 shows a cutaway view of a typical cylindrical alkaline battery 10. Alkaline battery 10 includes a steel can 15 having a cylindrical shape and one open end. A metalized, plastic film label 16 is formed about the exterior surthce of steel can 15 except for the ends of steel can 15. At the closed end of steel can 15 is a positive cover 17 preferably formed of plated steel. Film label 16 is formed over the peripheral edge of positive cover 17.

A cathode 20 preferably formed of a mixture of manganese dioxide, graphite, 45% potassium hydroxide solution, deionized water, an aqueous TEFLON™ solution comprising 20% polytetrafluoroethylene, and an additive, is formed about the interior side surface of steel can 15. A separator 30, which is preferably formed of a non-woven fabric that prevents migration of any solid particles in the battery, is disposed about the interior surface of cathode 20. An electrolyte 40 formed of potassium hydroxide is disposed in the interior of separator 30. An anode 50, preferably formed of zinc powder, a gelling agent and other additives, is disposed within electrolyte 40 in contact with a current collector 60, which may be formed of brass.

Current collector 60 contacts a brass rivet 70 formed at the open end of steel can 15. A nylon seal 71 is formed at the open end of steel can 15 to prevent leakage of the active ingredients contained in steel can 15. Nylon seal 71 contacts a metal washer 72 and an inner cell cover 74, which is preferably formed of steel. A negative cover 75, which is preferably formed of plated steel is disposed in contact with inner cell cover 74 and brass rivet 70, which contacts current collector 60 through a hole formed in nylon seal 71. Negative cover 75 is electrically insulated from steel can 15 by nylon seal 71.

The cathode of the present invention for a D-size cell is preferably composed of approximately 71.7 to 81.7 weight percent $MnO_2$, about 8.5 weight percent graphite, about 7.9 weight percent alkaline solution, such as a 45% KOH solution, about 0.4 weight percent deionized water, about 1.5 weight percent binder material, such as an aqueous TEFLON™ solution comprising 20% polytetrafiuoroethylene, and approximately 0.1 to 10 weight percent of an additive. More preferably, the weight percent of $MnO_2$ is between about 76.8 and 80.8 and the weight percent of the additive is between 1 and 5 such that the combined weight percent of $MnO_2$ and the additive is a constant of preferably approximately 81.8. The amount of alkaline solution used in the cathode varies according to cell size as does the amount of the binder material. Preferably, the additive is $SnO_2$, but may also include SnO, $BaTiO_3$, $K_2TiO_3$, $Al_2O_3$, $Fe_2O_3$-$TiO_2$, $TiO_2$ (P-25), or $Nb_2O_5$. (P-25) is a fumed titanium dioxide available from Degussa Corporation of Fairlawn, Ohio. Unlike most forms of titanium dioxide, which are produced using a precipitation technique, $TiO_2$ (P-25) is produced by high temperature (>1200° C.) flame hydrolysis of $TiCl_4$ in the presence of $O_2$ and $H_2$. From the burner, a coagulation of primary particles takes place during cooling which results in the final particle size and distribution. A series of cyclones separate the solid material from reaction gases. The product is then subjected to steam to remove HCl which is a by-product from the reaction. $TiO_2$ (P-25) is non-porous and has a particle shape that is cubic in nature with rounded edges. A crystallographic study of $TiO_2$ (P-25) shows that multiphases of amorphous, anatase and rutile fixms exist. The anatase-to-rutile ratio is between 70:30 and 80:20.

The cathode is made by weighing out the needed materials and mixing the $MnO_2$, the additive, and the graphite and blending to obtain a homogeneous mixture. The deionized water, the TEFLON™ solution and the KOH solution are then mixed with the dry cathode components to form a homogeneous cathode mix. The cathode mixture is then placed in steel can 15 and molded into an annular, cylindrical shape.

As stated above, it has been discovered that the addition of small amounts of the above listed additives significantly increases the service performance of alkaline electrochemical cells. The following comparative examples illustrate the advantages obtained from practicing the present invention.

COMPARATIVE EXAMPLE 1

Figure 2:
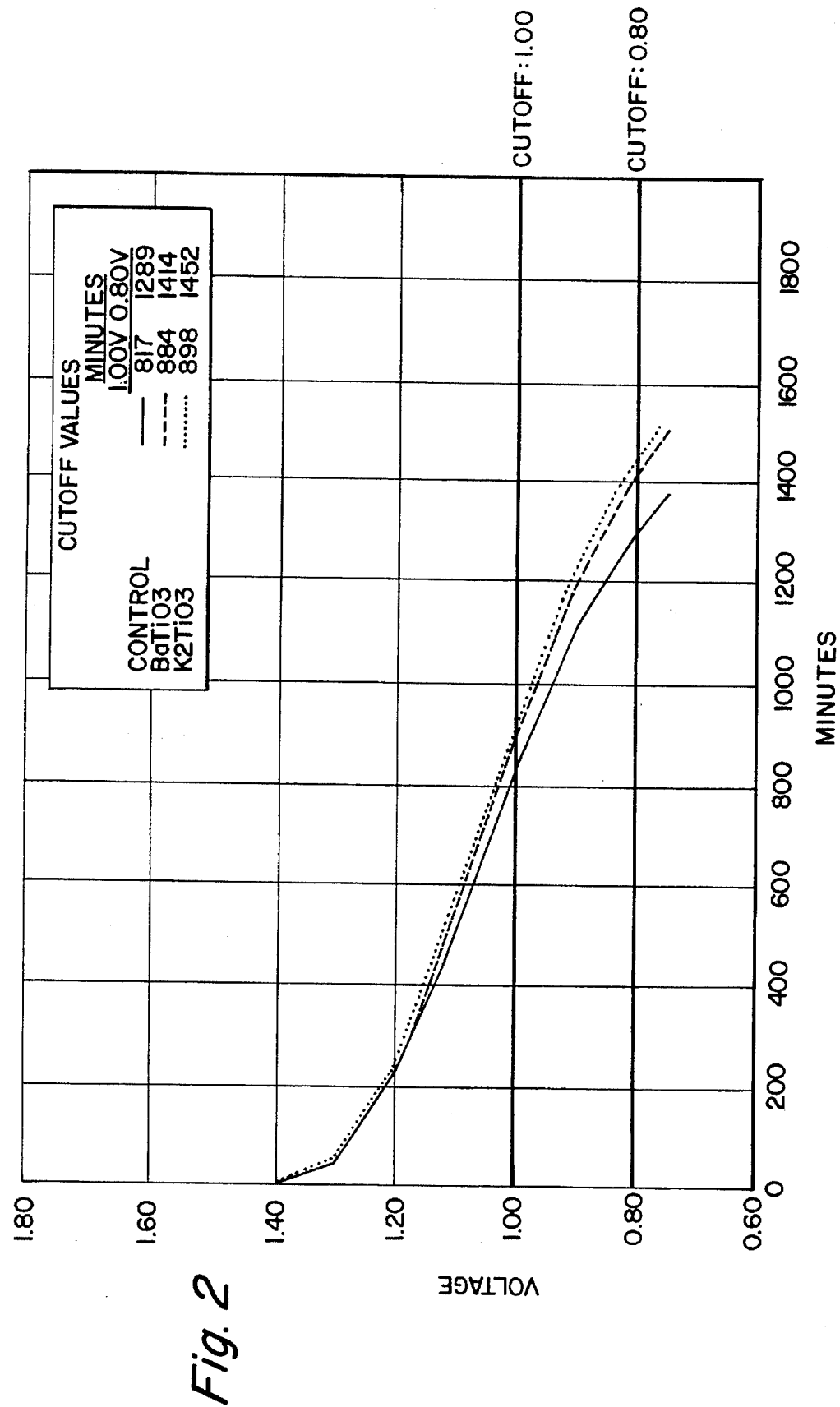
FIG. 2 is a comparative graph of the service performance of a standard alkaline cell having a cathode with no additives and electrochemical cells having cathodes with additives in accordance with the present invention.

Six control alkaline D-size cells were prepared as described above except no additive was included in the cathodes. In the control cells, the weight percentage of $MnO_2$ relative to the cathode was equal to the combined weight percentage of $MnO_2$ and the additive in the experimental cells. Six experimental D-size cells having a cathode with 1.6 weight percent of $SnO_2$, six experimental D-size cells having an additive of $Fe_2O_3$-$TiO_2$, and six experimental D-size cells including a $TiO_2$ (P-25) additive were also constructed. Cells from each of the experimental lots were continuously connected to a 1.0 Ohm load and the voltages of the cells were measured over a period of time. FIG. 2 shows a graph of the time versus voltage discharge profiles of the cells. At a cutoff voltage of 0.75 volt, experimental cells including the $SnO_2$ additive exhibited an average 24% increase in service performance over the control cells. The experimental cells including the $Fe_2O_3$-$TiO_2$ and the $TiO_2$ (P-25) additive both had a 9% increase in service performance over the control cells.

COMPARATIVE EXAMPLE 2

Figure 3:
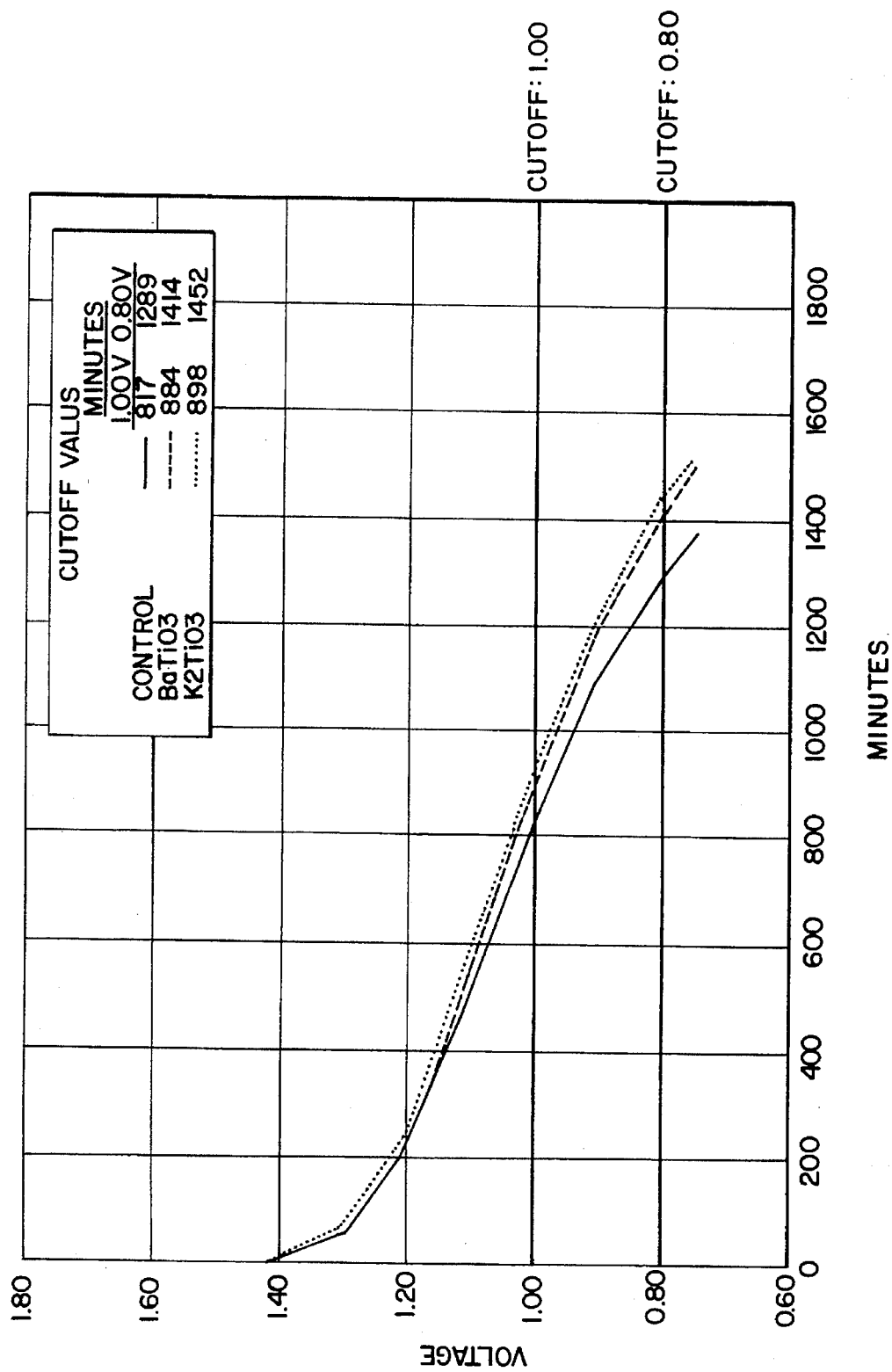
FIG. 3 is a comparative graph of the service performance of a standard alkaline cell having a cathode with no additives and electrochemical cells having cathodes with additives in accordance with the present invention.

Six experimental D-size cells having a $BaTiO_3$ additive and six experimental D-size cells having a $K_2TiO_3$ additive were constructed, along with control cells having no additive. Each of the cells was connected to a 2.2 Ohm load for one hour per day. FIG. 3 shows the resulting time versus voltage discharge profiles for the cells. For a 1.00 volt cutoff, the experimental cells with the $K_2TiO_3$ additive showed an average 10% increase over the service performance of the control cells. The experimental cells having the $BaTiO_3$ additive exhibited an average 8% increase in service performance over the control cells. At a 0.80 volt cutoff, the experimental cells having the $K_2TiO_3$ additive had an average 13% increase in service performance over the control cells, while the experimental cells containing the $BaTiO_3$ had an average 10% increase in service performance over the control cells.

COMPARATIVE EXAMPLE 3

Figure 4:
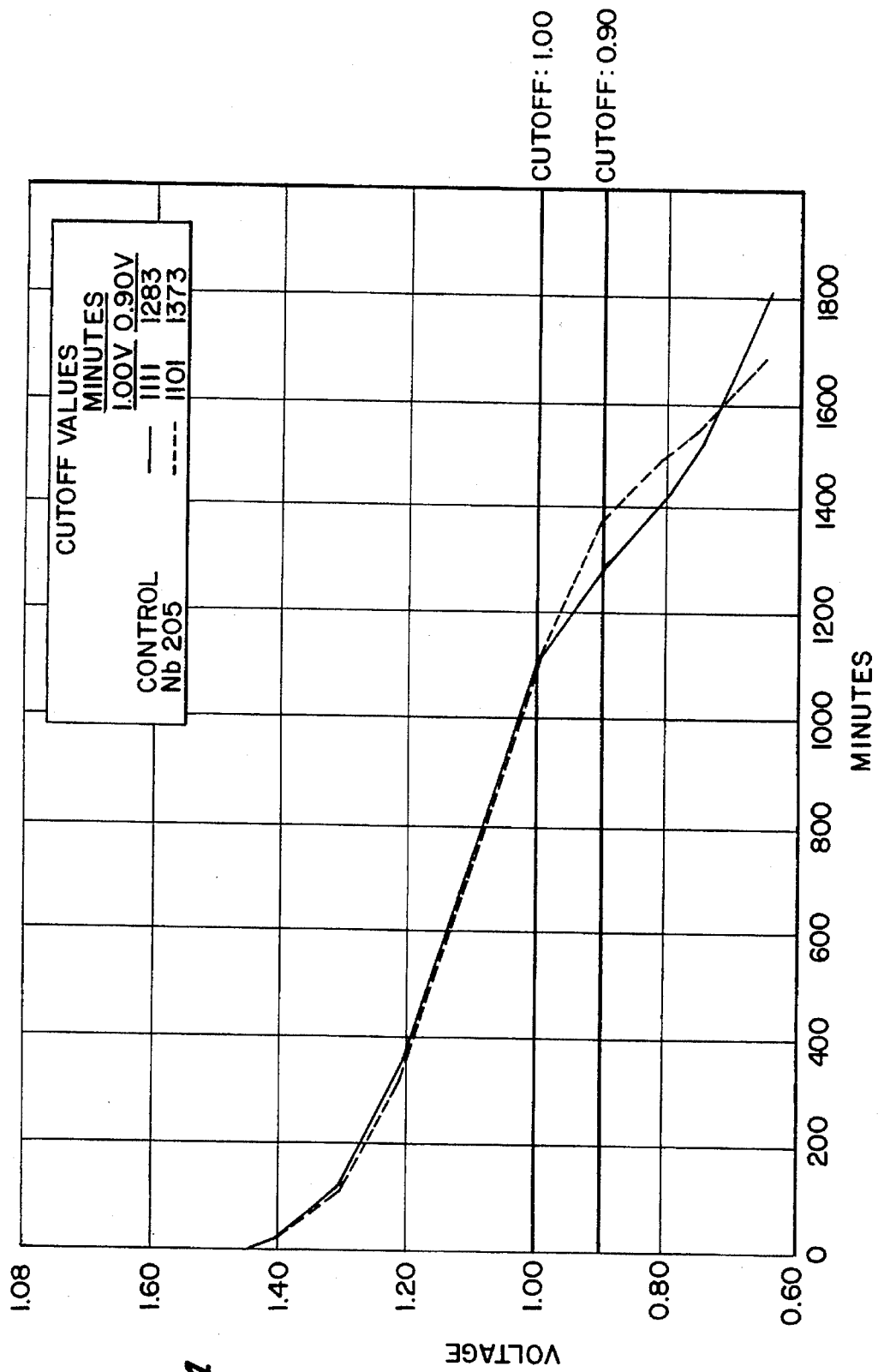
FIG. 4 is a comparative graph of the service performance of a standard alkaline cell having a cathode with no additives and an electrochemical cell having a cathode with an additive in accordance with the present invention.

Six experimental D-size cells having a $Nb_2O_5$ additive and control cells having no additive were constructed and subjected to a 2.2 Ohm light intermittent flashlight (LIF) test, whereby the cells were connected to a 2.2 Ohm load for four minutes per hour for eight consecutive hours per day. FIG. 4 shows the resulting time versus voltage discharge profiles tbr the experimental cells and the control cells. At a 1.00 volt cutoff, the experimental cells showed no improvement in service performance over the control cells. However, at a 0.90 volt cutoff, the experimental cells had an average 7% increase in service performance over the control cells.

COMPARATIVE EXAMPLE 4

Figure 5:
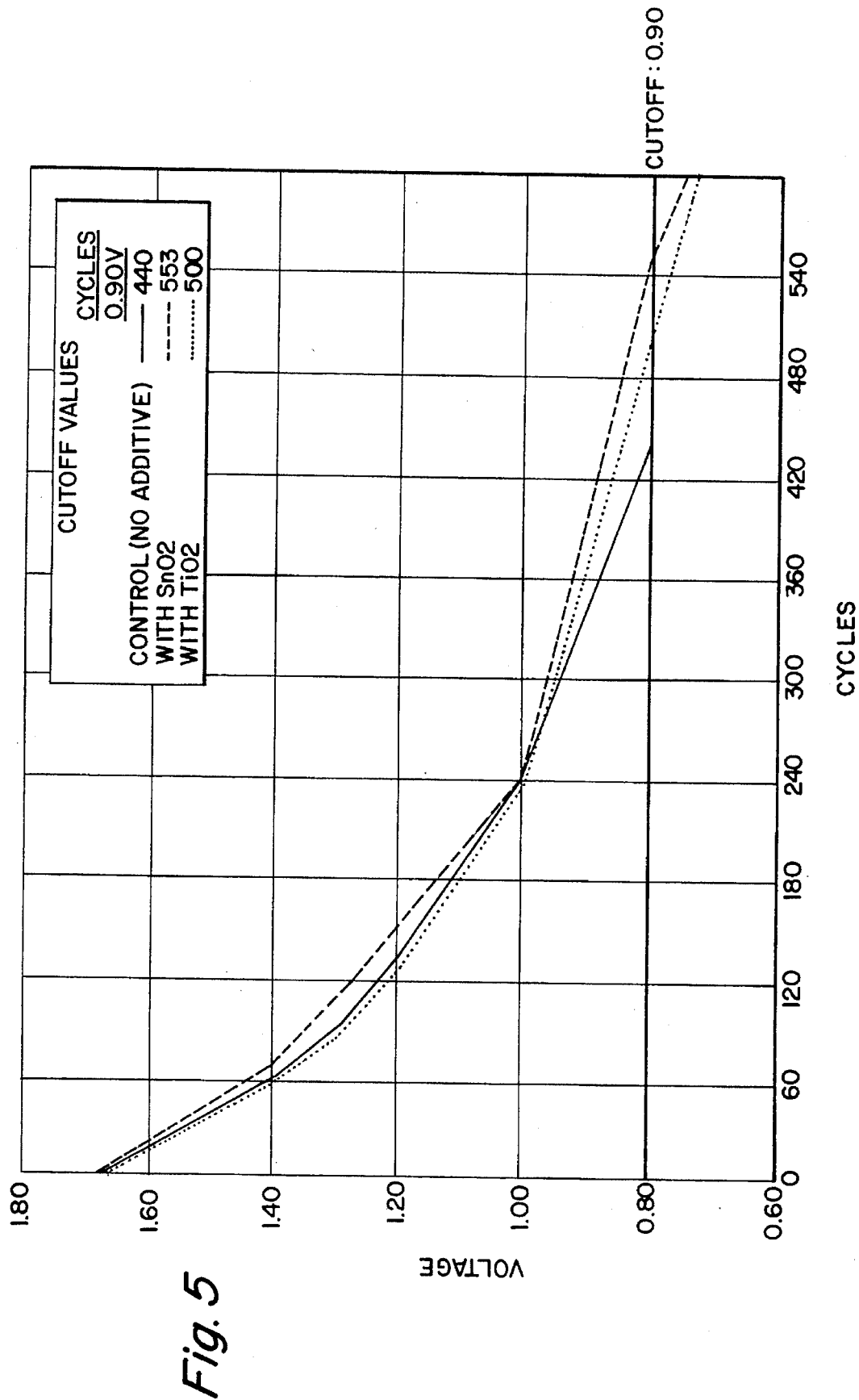
FIG. 5 is a comparative graph of the service performance of a standard alkaline cell having a cathode with no additives and an electrochemical cell having a cathode with an additive in accordance with the present invention.

Six control alkaline AA-size cells were prepared as described above, except no additive was included in the cathodes. Six experimental AA-size cells having a cathode with 1.6 weight percent $SnO_2$ were also constructed. The cells were subjected to an IEC photoflash test by connecting each cell to a 1.8 Ohm load for cycles of fifteen seconds oil and forty-five seconds off (i.e., each full cycle equaling one minute) and the number of cycles were recorded to a specific voltage cutoff. FIG. 5 shows a graph of the cycle versus voltage discharge profiles of the cells. At a cutoff voltage of 0.90 volt, the experimental cells including the $SnO_2$ additive exhibited an average 25% increase in service performance over the control cells.

As is apparent from the above comparative examples, significant increases in service performance of an alkaline electrochemical cell may be obtained using additives of $SnO_2$, $Fe_2O_3$-$TiO_2$, $TiO_2$ (P-25), $BaTiO_3$, $K_2TiO_3$, and $Nb_2O_5$. Increases in service performance have also been obtained using SnO additive.

Although the above comparative examples were restricted to D and AA-size cells, it will be appreciated by those skilled in the art that the increase in service performance may be obtained regardless of the cell size. Because some of the above additives perform better than others in continuous tests while others perform better on intermittent tests, may be desirable to combine such additives to enhance the overall service performance of an electrochemical cell for both continuous and intermittent use.

It will be understood by those who practice the invention and by those skilled in the art that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. An electrochemical cell having an anode, a cathode, and an electrolyte, said cathode comprising a manganese dioxide active material and an additive comprising $Fe_2O_3$-$TiO_2$.

2. The electrochemical cell as defined in claim 1, wherein said anode includes zinc and the electrolyte is an alkaline electrolyte.

3. The electrochemical cell as defined in claim 1, wherein said additive constitutes between about 0.1 to 10 weight percent of said cathode.

4. An electrochemical cell having an anode, a cathode, and an electrolyte, said cathode comprising a manganese dioxide active material and an additive comprising fumed $TiO_2$.

5. An electrochemical cell having an anode, a cathode, and an electrolyte, said cathode comprising a manganese dioxide active material and an additive comprising a combination of anatase and rutile $TiO_2$.

6. The electrochemical cell as defined in claim 5, wherein said combination of anatase and rutile $TiO_2$ includes at least 20 percent rutile $TiO_2$.

7. A primary akaline electrochemical cell having a zinc anode, a cathode, and an electrolyte, said cathode comprisLng a manganese dioxide active material and an additive comprising $Nb_2O_5$.

8. The electrochemical cell as defined in claim 7, wherein said additive constitutes between about 0.1 to 10 weight percent of said cathode.

9. An electrochemical cell having an anode, a cathode, and an electrolyte, said cathode comprising a manganese dioxide active material and an additive comprising SnO.

* * * * *